A. T. PERINAN.
ROTARY CUTTING APPARATUS FOR METAL WORK.
APPLICATION FILED APR. 11, 1921.
1,418,459.
Patented June 6, 1922.
2 SHEETS—SHEET 1.
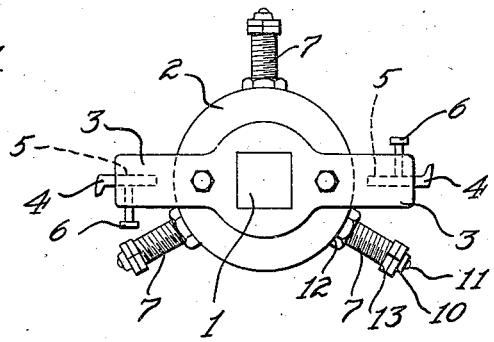
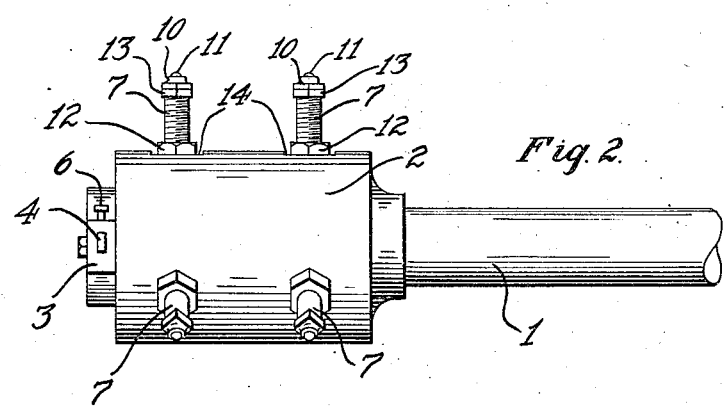
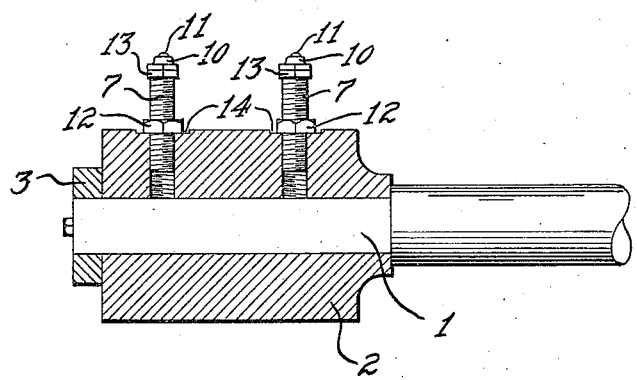
A. T. Perinan.
INVENTOR
BY Victor J. Evans
ATTORNEY
WITNESS:

A. T. PERINAN.
ROTARY CUTTING APPARATUS FOR METAL WORK.
APPLICATION FILED APR. 11, 1921.

1,418,459.

Patented June 6, 1922.
2 SHEETS—SHEET 2.

A. T. Perinan.
INVENTOR

BY Victor J. Evans
ATTORNEY

UNITED STATES PATENT OFFICE.

ANTONIO TORRES PERINAN, OF SOUTH BETHLEHEM, PENNSYLVANIA.

ROTARY CUTTING APPARATUS FOR METAL WORK.

1,418,459.  Specification of Letters Patent.  Patented June 6, 1922.

Application filed April 11, 1921. Serial No. 460,275.

*To all whom it may concern:*

Be it known that I, ANTONIO TORRES PERINAN, a subject of the King of Spain, residing at South Bethlehem, in the county of Northampton and State of Pennsylvania, have invented new and useful Improvements in Rotary Cutting Apparatus for Metal Work, of which the following is a specification.

The object of my present invention is the provision of a simple and inexpensive apparatus for efficiently cutting the interior or bore walls of cannon and other large tubular work, and this with a minimum amount of friction which obviously conduces to economy in power required.

To the attainment of the foregoing, the invention consists in the improvement as hereinafter described and definitely claimed.

In the accompanying drawings, forming part hereof:—

Figure 1 is a front elevation of my novel apparatus.

Figure 2 is a side elevation of the same.

Figure 3 is a longitudinal central section taken in the plane indicated by the line 3—3 of Figure 1.

Similar numerals designate corresponding parts in Figures 1 to 4 to which reference will first be made.

Figure 4:
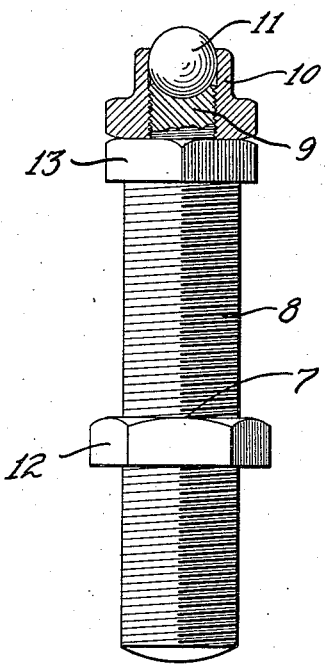
Figure 4 is an enlarged view showing one of the struts made up respectively of a bolt, nut and anti-friction ball.

As hereinbefore indicated my novel apparatus is designed primarily to make cuttings inside of cannon and other large tubular metal work, and among other elements the apparatus comprises a shaft 1, a cylindrical body 2 carried by the shaft and arms 3; the said arms 3 being designed to carry cutters 4 which are seated at 5 in the ends of the arms and are detachably secured in position through the medium of set screws 6. The cutters protrude from and extend a considerable distance beyond the ends of the arms 3, and from this it follows that there is ample clearance for the cuttings made.

Grouped about the body 2 are struts 7 which have for their function to center the body 2 and to eliminate to a large extent friction incident to the movement of the body 2 endwise of the cannon or piece of ordnance.

As best shown in Figure 4 each of the struts 7 is made up of a threaded bolt 8, a casing 9 formed integral with the threaded bolt at the outer end thereof and having a socket 10, a ball 11 disposed in said socket and adapted to bear against the wall of a bore in a cannon or the like, and a nut 12 mounted on the inner portion of the threaded bolt. The exterior of the inner portion of the casing 9 is of angular form in cross section as indicated by 13 so that the bolt 8 may be expeditiously and easily turned about its axis for purposes of adjustment. The nut 12 is seated in a recess 14 in the body 2 and is designed to bear inwardly against the said body in order to maintain its bolt 8 in proper position relatively to the body.

Figure 5:
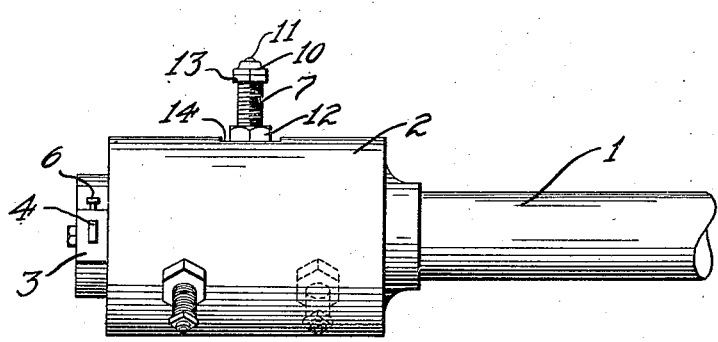
Figure 5 is an elevation showing a modified arrangement of the radial struts, relatively to the body of the apparatus.

As clearly brought out in Figure 5 the struts 7 may be and preferably are arranged in staggered relation to the body 2, particularly when the body is of considerable length for long work.

In the practical use of my novel apparatus it will be apparent that the balls 11 will practically eliminate friction incident to the movements of the apparatus as a whole about its axis and also lengthwise of the cannon that is being operated upon. It will also be apparent that little or no lubrication is necessary in the operation of my improved apparatus, and that its operation does not subject workmen to danger.

Having described my invention, what I claim and desire to secure by Letters-Patent, is:—

1. A rotary metal cutting apparatus for interior work comprising a body having arms, cutters carried by said arms, and struts adapted for interposition between the body and a wall of the piece of work in which the body is disposed; the said struts respectively including a threaded bolt with a socket at its outer end, a ball in said socket and adapted to bear against said wall, and a nut mounted on the bolt and bearing inwardly against the body.

2. A rotary metal cutting apparatus for interior work comprising a body having arms, cutters carried by said arms, and struts adapted for interposition between the body and a wall of the piece of work in which the body is disposed; the said struts respectively including a threaded bolt with a socket at its outer end, a ball in said socket and adapted to bear against said wall, and a nut mounted on the bolt and bearing inwardly against the body; the said socket at the outer end of the bolt being formed in a casing the exterior of the inner portion of which is of angular form in cross section.

In testimony whereof I affix my signature.

ANTONIO TORRES PERINAN.